(12) United States Patent
Nara et al.

(10) Patent No.: US 12,086,222 B2
(45) Date of Patent: Sep. 10, 2024

(54) INFORMATION PROCESSING APPARATUS AND INFORMATION PROCESSING SYSTEM

(71) Applicant: Faurecia Clarion Electronics Co., Ltd., Saitama (JP)

(72) Inventors: Norikazu Nara, Saitama (JP); Naoto Sakata, Saitama (JP); Tetsuro Murakami, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 507 days.

(21) Appl. No.: 17/376,487

(22) Filed: Jul. 15, 2021

(65) Prior Publication Data

US 2022/0027445 A1    Jan. 27, 2022

(30) Foreign Application Priority Data

Jul. 21, 2020 (JP) .................. 2020-124387

(51) Int. Cl.
*G06F 21/32* (2013.01)
*G06F 18/23* (2023.01)
(Continued)

(52) U.S. Cl.
CPC .............. *G06F 21/32* (2013.01); *G06F 18/23* (2023.01); *G06N 20/00* (2019.01); *G08G 1/20* (2013.01); *H04W 4/023* (2013.01)

(58) Field of Classification Search
CPC .............................. G06F 18/23; H04W 4/023
(Continued)

(56) References Cited

U.S. PATENT DOCUMENTS

| 11,734,783 B2 * | 8/2023 | Misra ..................... G06V 20/10 |
| 2005/0143905 A1 * | 6/2005 | Yoshikawa ........ G01C 21/3617 |
| | | 701/424 |

(Continued)

FOREIGN PATENT DOCUMENTS

| JP | 2005-181241 A | 7/2005 |
| JP | 2007-269109 A | 10/2007 |

(Continued)

OTHER PUBLICATIONS

Japanese Office Action issued on Mar. 12, 2024 in corresponding Japanese patent application No. 2020-124387.

*Primary Examiner* — Teshome Hailu
(74) *Attorney, Agent, or Firm* — IP Business Solutions, LLC

(57) ABSTRACT

A first server apparatus is communicably connected to each of a second server apparatus having a server-less function and a vehicle and includes an obtaining unit obtaining, from the vehicle, start position information indicating a start position of the vehicle, start date-and-time information indicating a start date and time of the vehicle, parking position information indicating a parking position of the vehicle, and parking date-and-time information indicating a parking date and time of the vehicle, an estimating unit estimating a date and time at which the vehicle is started based on the start position, the start date and time, the parking position and the parking date and time, and an instructing unit instructing the second server apparatus to activate a personal authentication program in accordance with an estimation result by the estimating unit.

7 Claims, 11 Drawing Sheets

(51) Int. Cl.
  *G06N 20/00*     (2019.01)
  *G08G 1/00*      (2006.01)
  *H04W 4/02*      (2018.01)
(58) Field of Classification Search
  USPC ........................................................ 713/186
  See application file for complete search history.

(56) References Cited

U.S. PATENT DOCUMENTS

| | | |
|---|---|---|
| 2017/0259683 A1 | 9/2017 | Shimizu et al. |
| 2017/0261331 A1 | 9/2017 | Shimizu et al. |
| 2019/0213873 A1* | 7/2019 | Adireddy ............. G08G 1/0116 |
| 2020/0065679 A1* | 2/2020 | Javeri ................ G01C 21/3617 |
| 2020/0126126 A1* | 4/2020 | Briancon ................ G06N 20/20 |
| 2021/0174257 A1* | 6/2021 | Pothula ................... G06F 16/27 |

FOREIGN PATENT DOCUMENTS

| | | |
|---|---|---|
| JP | 2011-201443 A | 10/2011 |
| JP | 2017-162473 A | 9/2017 |
| JP | 2017-163823 A | 9/2017 |
| JP | 2020-030485 A | 2/2020 |

* cited by examiner

INFORMATION PROCESSING APPARATUS AND INFORMATION PROCESSING SYSTEM

INCORPORATION BY REFERENCE

The present application claims priority under 35 U.S.C. § 119 to Japanese Patent Application No. 2020-124387 filed on Jul. 21, 2020. The content of the application is incorporated herein by reference in its entirety.

BACKGROUND OF THE INVENTION

Field of the Invention

The present invention relates to an information processing apparatus and an information processing system.

Description of the Related Art

Conventionally, a technology that activates a function involving communication with a server apparatus by an electronic apparatus mounted in a vehicle immediately after a driver boards the vehicle has been disclosed in, for example, Japanese Patent Laid-Open No. 2005-181241.

A navigation system disclosed in Japanese Patent Laid-Open No. 2005-181241 includes an input processing unit that collects life information of a user, a life information processing unit that patterns and registers the collected life information, and a prediction processing unit that acquires a predicted departure time and a destination based on the patterned life information and generates predicted traffic information associated with a time range including the predicted departure time and associated with geographical range including the destination.

However, according to Japanese Patent Laid-Open No. 2005-181241, in a case where, for example, patterning life information is difficult or the method for patterning life information is not appropriate, there is a possibility that a predicted departure time cannot be properly estimated.

It is an object of the present invention to provide an information processing apparatus and an information processing system which can properly estimate a start date and time of a vehicle.

SUMMARY OF THE INVENTION

In order to achieve the object, an information processing apparatus according to an embodiment is an information processing apparatus communicably connected to each of an application server apparatus having a server-less function and a vehicle, the information processing apparatus including an obtaining unit obtaining, from the vehicle, start position information indicating a position where the vehicle has been started, start date-and-time information indicating a date and time at which the vehicle has been started, parking position information indicating a position where the vehicle has been parked, and parking date-and-time information indicating a date and time at which the vehicle has been parked, an estimating unit estimating a date and time at which the vehicle is started based on the start position information, the start date-and-time information, the parking position information and the parking date-and-time information, and an instructing unit instructing the application server apparatus to activate an application program in accordance with an estimation result by the estimating unit.

Also, in order to achieve the object, an information processing system according to the embodiment includes an application server apparatus having a server-less function, a vehicle, and the information processing apparatus being communicably connected to each of the application server apparatus and the vehicle.

Advantageous Effects of Invention

According to an information processing apparatus and an information processing system according to the embodiment, because the estimating unit estimates a date and time at which a vehicle is started based on start position information, start date-and-time information, parking position information and parking date-and-time information, there is a possibility that the estimating unit can properly estimate a date and time at which the vehicle is started. Also, because the instructing unit instructs to activate an application program to the application server apparatus having a server-less function in accordance with an estimation result by the estimating unit, there is a possibility that the application program can be activated at a proper date and time.

DETAILED DESCRIPTION OF THE PREFERRED EMBODIMENTS

Embodiments are described below with reference to drawings.

1. Configuration of Information Processing System

Figure 1:
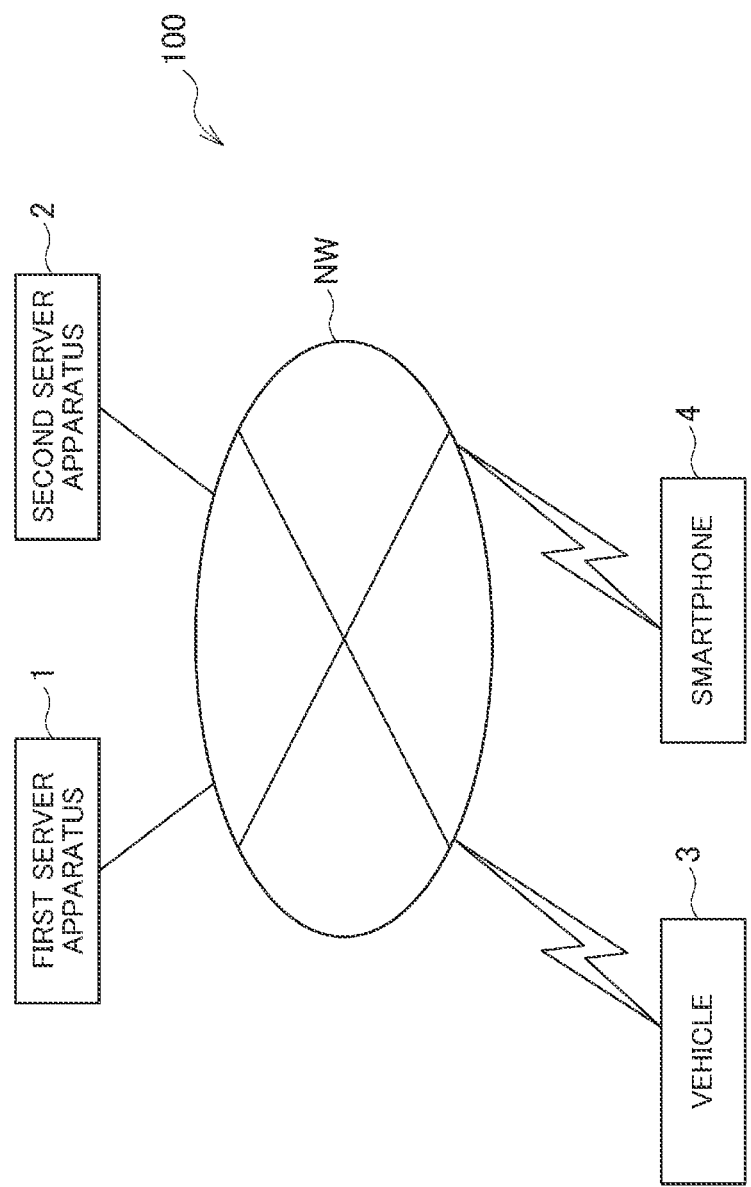
FIG. 1 shows an example of a configuration of an information processing system according to an embodiment.

FIG. 1 shows an example of a configuration of an information processing system 100 according to an embodiment.

As shown in FIG. 1, the information processing system 100 includes a first server apparatus 1, a second server apparatus 2, a vehicle 3, and a smartphone 4.

The first server apparatus 1 is communicably connected to the second server apparatus 2, the vehicle 3, and the smartphone 4 over a network NW. According to this embodiment, the first server apparatus 1 is configured as an application server apparatus having a server-less function. The network NW is, for example, the Internet.

The first server apparatus 1 instructs the second server apparatus 2 to activate an application program based on various kinds of information received from the vehicle 3. According to this embodiment, the application program is a personal authentication program that executes personal authentication processing on a driver of the vehicle 3.

In other words, the personal authentication program corresponds to an example of the "application program".

The first server apparatus 1 corresponds to an example of an "information processing apparatus".

Although, according to this embodiment, a case is described where the "information processing apparatus" is configured as the first server apparatus 1, embodiments of the present invention are not limited thereto. The "information processing apparatus" may be configured as a personal computer, or the "information processing apparatus" may be configured as a tablet terminal.

The second server apparatus 2 is communicably connected to the first server apparatus 1 and the vehicle 3 over the network NW. The second server apparatus 2 activates the personal authentication program based on an instruction from the first server apparatus 1. When a driver boards the vehicle 3, the personal authentication program obtains a facial image of the driver from the vehicle 3 and executes personal authentication processing on the driver.

The second server apparatus 2 corresponds to an example of an "application server apparatus having a server-less function". In other words, the second server apparatus 2 is configured as an application server apparatus having a server-less function.

It should be noted that the server-less function is an execution model of cloud computing that dynamically manages allocation of machines and resources required for applications and charges based on each of the resource amounts to be used for satisfying each application request rather than charging based on a previous purchase.

An application server apparatus having a server-less function has a problem so-called "Cold Start". "Cold Start" indicates that time is required for initial activation of an application program. In an application server apparatus having a server-less function, the time required for initial activation of an application program is, for example, 10 seconds.

Meanwhile, the personal authentication processing on a driver is required to be executed when a driver boards the vehicle 3 and starts the vehicle 3. Accordingly, in a case where the personal authentication program is executed in an application server apparatus having a server-less function, there is a possibility that the problem of "Cold Start" becomes manifest.

The first server apparatus 1 and the information processing system 100 according to this embodiment have an effect that the problem of Cold Start can be solved as described below.

When the vehicle 3 is started, the vehicle 3 transmits, to the first server apparatus 1, start position information indicating a start position LS that is a position where the vehicle 3 has been started, start date-and-time information indicating a start date and time TS that is a date and time at which the vehicle 3 has been started, and start day-of-week information indicating a start day of the week DS on which the vehicle 3 has been started.

Figure 2:
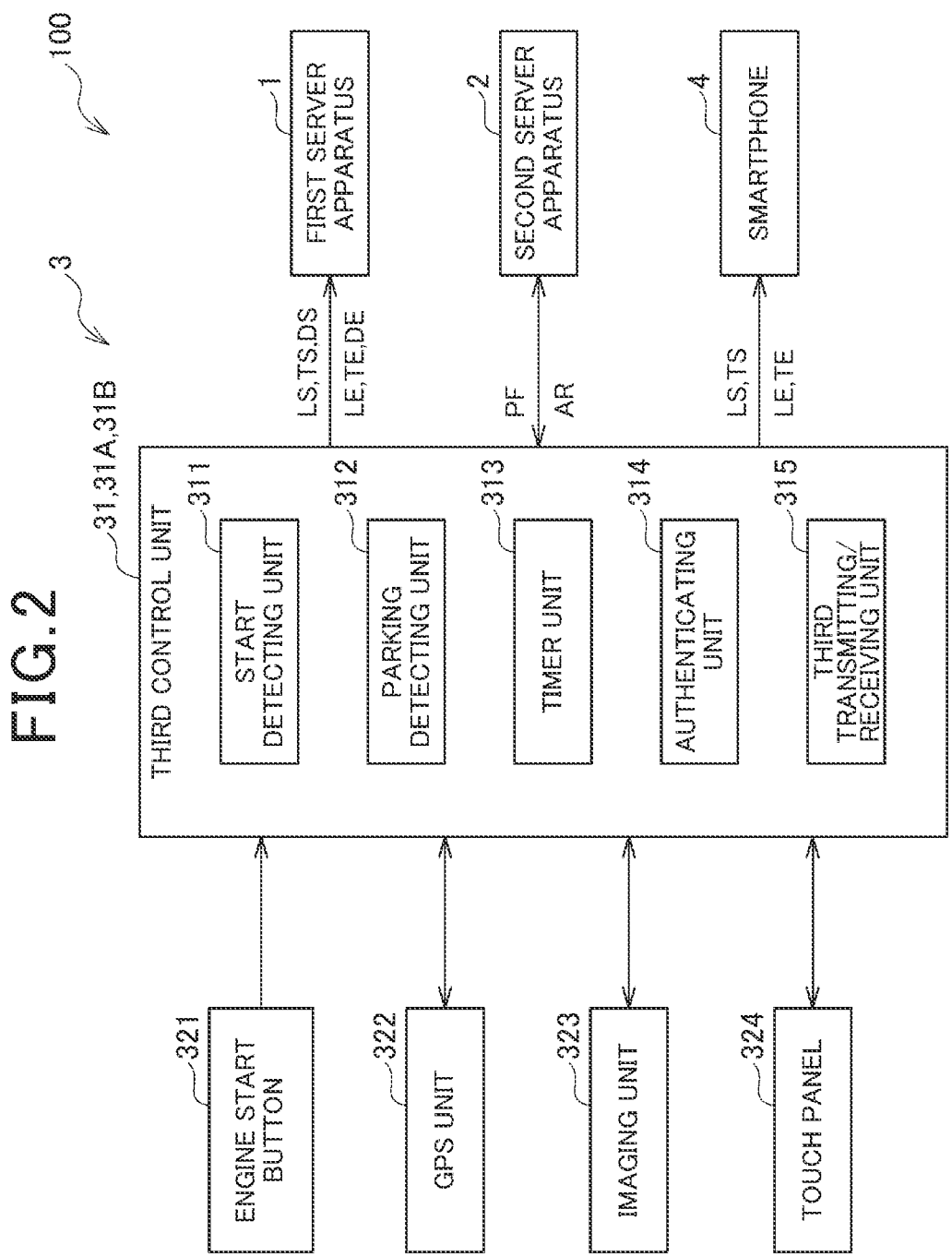
FIG. 2 shows an example of a configuration of a vehicle according to the embodiment.

Here, the term "start" refers to an operation which causes the vehicle 3 to have a drivable state and, according to this embodiment, indicates an operation that an engine start button 321 shown in FIG. 2 is pressed when an engine has an OFF state. When the engine start button 321 is pressed, the engine is thus turned to an ON state.

Although the term "start" refers to an operation in which the engine start button 321 is pressed when an engine has an OFF state according to this embodiment, embodiments of the present invention are not limited thereto. For example, the term "start" may refer to an operation in which an accessory (ACC) power supply is turned on.

When the vehicle 3 is parked, the vehicle 3 transmits, to the first server apparatus 1, parking position information indicating a parking position LE that is a position where the vehicle 3 has been parked, parking date-and-time information indicating a parking date and time TE that is a date and time at which the vehicle 3 has been parked, and parking day-of-week information indicating a parking day of the week DE that is a day of the week on which the vehicle 3 has been parked.

Here, the term "park" refers to an operation which causes the vehicle 3 to have an undrivable state and, according to this embodiment, indicates an operation in which the engine start button 321 shown in FIG. 2 is pressed when the engine has an ON state. When the engine start button 321 is pressed, the engine is thus turned to an OFF state.

Although the term "park" refers to the operation in which the engine start button 321 is pressed when an engine has an ON state according to this embodiment, embodiments of the present invention are not limited thereto. For example, the term "park" may refer to an operation in which the accessory (ACC) power supply is turned off.

The smartphone 4 is carried by a driver of the vehicle 3. Also, the smartphone 4 transmits, to the first server apparatus 1, approach information indicating an approach state AP that the distance to the vehicle 3 is less than a predetermined distance and a separation information indicating a separation state SP that the distance to the vehicle 3 is greater than or equal to the predetermined distance. In other words, the smartphone 4 has a Geo-fencing function.

The smartphone 4 corresponds to an example of a "mobile terminal apparatus".

Although a case is described where the "mobile terminal apparatus" is the smartphone 4 according to this embodiment, embodiments of the present invention are not limited thereto. The "mobile terminal apparatus" is only required to be a terminal apparatus that is carried by a driver of the vehicle 3. The "mobile terminal apparatus" may be, for example, a cellular phone or a tablet terminal.

2. Each of Apparatuses Included in Information Processing System

Next, a configuration of each of the first server apparatus 1, the second server apparatus 2, the vehicle 3 and the smartphone 4 included in the information processing system 100 is described with reference to FIGS. 2 to 5.

[2-1. Configuration of Vehicle]

FIG. 2 shows an example of a configuration of the vehicle 3 according to this embodiment.

The vehicle 3 is communicably connected to each of the first server apparatus 1, the second server apparatus 2 and the smartphone 4.

The vehicle 3 has a third control unit 31, the engine start button 321, a GPS unit 322, an imaging unit 323, and a touch panel 324.

The engine start button 321 is disposed in a front part of a driver seat of the vehicle 3 and is pressed by a driver to turn on/off the engine.

If the engine start button 321 is pressed when the engine has an OFF state, the engine is turned to an ON state. If the engine start button 321 is pressed when the engine has an ON state, the engine is turned to an OFF state.

The GPS unit 322 includes a receiver that receives GPS signal from a global positioning system (GPS) to acquire positional information of the vehicle 3. The positional information includes latitude information and longitude information.

The imaging unit 323 is disposed in a front part of the driver seat of the vehicle 3, has an imaging device (image sensor) such as a charge coupled device (CCD) or a complementary metal-oxide-semiconductor (CMOS), and generates a facial image PF of a driver in accordance with an instruction from the third control unit 31.

The touch panel 324 is disposed in, for example, a left front part of the driver seat of the vehicle 3, has a display such as a liquid crystal display (LCD), and displays various kinds of images on the LCD. Also, the touch panel 324 includes a touch sensor integrated to a display surface of the LCD and receives a touch operation performed with a fingertip or the like of the driver.

The third control unit 31 is configured as, for example, electronic control unit (ECU). The third control unit 31 has a third processor 31A such as a central processing unit (CPU) or a micro-processing unit (MPU), and a third memory 31B such as a read only memory (ROM) or a random access memory (RAM).

In addition to these devices, the third control unit 31 has an interface circuit for connecting a sensor and the like, peripheral devices and the like, and a vehicle-mounted network communication circuit or the like that communicates with another vehicle-mounted devices over a vehicle-mounted network.

The third control unit 31 has a start detecting unit 311, a parking detecting unit 312, a timer unit 313, an authenticating unit 314, and a third transmitting/receiving unit 315. Specifically, the third processor 31A in the third control unit 31 executes a third control program stored in the third memory 31B to function as the start detecting unit 311, the parking detecting unit 312, the timer unit 313, the authenticating unit 314, and the third transmitting/receiving unit 315.

The third transmitting/receiving unit 315 (transmitter/receiver) transmits and receives various kinds of information over the network NW to and from each of the first server apparatus 1, the second server apparatus 2, and the smartphone 4. Each of the first server apparatus 1 and the second server apparatus 2 is a server computer having a processor.

The third transmitting/receiving unit 315 transmits, to the first server apparatus 1, for example, start position information indicating a start position LS, start date-and-time information indicating a start date and time TS, start day-of-week information indicating a start day of the week DS, parking position information indicating a parking position LE, parking date-and-time information indicating a parking date and time TE, and parking day-of-week information indicating a parking day of the week DE. Also, the third transmitting/receiving unit 315 transmits, for example, facial image information indicating a facial image PF of a driver to the second server apparatus 2 and receives authentication result information indicating an authentication result AR from the second server apparatus 2. Also, the third transmitting/receiving unit 315 transmits, to the smartphone 4, for example, the start position information indicating a start position LS, the start date-and-time information indicating a start date and time TS, the parking position information indicating a parking position LE, and the parking date-and-time information indicating a parking date and time TE.

If the engine start button 321 is pressed when the engine has an OFF state, the start detecting unit 311 detects that the vehicle 3 has been started. Then, the start detecting unit 311 obtains positional information indicating a position of the vehicle 3 from the GPS unit 322 and generates start position information indicating a start position LS. Also, the start detecting unit 311 obtains date-and-time information indicating a date and time and day-of-week information indicating a day of the week from the timer unit 313 and generates start date-and-time information indicating a start date and time TS and start day-of-week information indicating a start day of the week DS.

Also, the start detecting unit 311 transmits the start position information indicating the start position LS, the start date-and-time information indicating the start date and time TS and the start day-of-week information indicating the start day of the week DS to the first server apparatus 1 through the third transmitting/receiving unit 315.

Also, the start detecting unit 311 transmits the start position information indicating the start position LS and the start date-and-time information indicating the start date and time TS to the smartphone 4 through the third transmitting/receiving unit 315.

If the engine start button 321 is pressed when the engine has an ON state, the parking detecting unit 312 detects that the vehicle 3 has been parked. Then, the parking detecting unit 312 obtains positional information indicating a position of the vehicle 3 from the GPS unit 322 and generates parking position information indicating a parking position LE. Also, the parking detecting unit 312 obtains date-and-time information indicating a date and time and day-of-week information indicating a day of the week from the timer unit 313 and generates parking date-and-time information indicating a parking date and time TE and parking day-of-week information indicating a parking day of the week DE.

Also, the parking detecting unit 312 transmits the parking position information indicating the parking position LE, the parking date-and-time information indicating the parking date and time TE and the parking day-of-week information indicating the parking day of the week DE to the first server apparatus 1 through the third transmitting/receiving unit 315.

In the following description, the parking position information indicating a parking position LE, the parking date-and-time information indicating a parking date and time TE and the parking day-of-week information indicating a parking day of the week DE may be called "parking information" for convenience.

Also, the parking detecting unit 312 transmits the parking position information indicating the parking position LE and the parking date-and-time information indicating the parking date and time TE to the smartphone 4 through the third transmitting/receiving unit 315.

The timer unit 313 measures dates and time. The timer unit 313 obtains date-and-time information from the GPS through the GPS unit 322 and updates the date and time. Also, the timer unit 313 may obtain date-and-time information from, for example, the server apparatus communicably connected thereto and update the date and time.

The authenticating unit 314 executes personal authentication processing on a driver of the vehicle 3. Specifically, when the vehicle 3 is started, the authenticating unit 314 causes the imaging unit 323 to generate a facial image PF of the driver and obtains the generated facial image PF from the imaging unit 323. Then, the authenticating unit 314 transmits the obtained facial image PF to the second server apparatus 2. The second server apparatus 2 executes personal authentication processing on the driver based on the facial image PF and transmits an authentication result AR to the authenticating unit 314 in the vehicle 3. The authenticating unit 314 displays the authentication result AR on the LCD of the touch panel 324.

Also, if the authentication result AR indicates success of the authentication, the third control unit 31 permits driving of the vehicle 3. If the authentication result AR indicates failure of the authentication, the third control unit 31 inhibits driving of the vehicle 3.

[2-2. Configuration of Smartphone]

Figure 3:
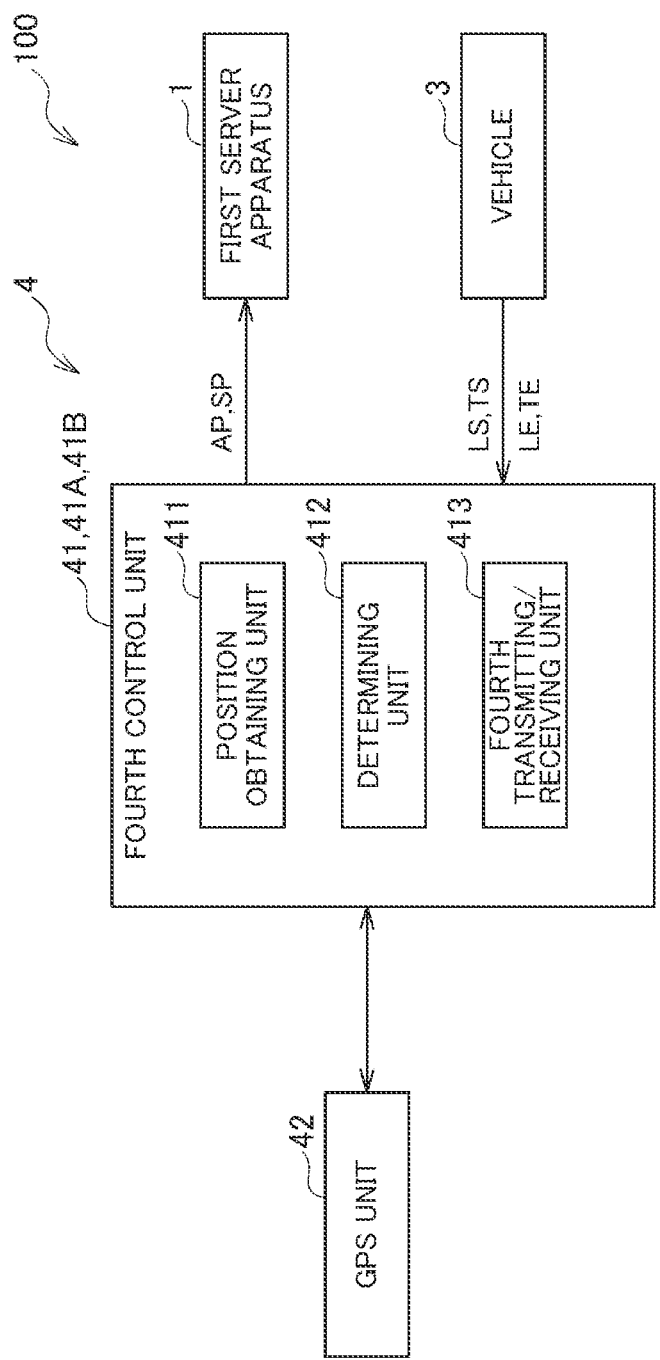
FIG. 3 shows an example of a configuration of a smartphone according to the embodiment.

FIG. 3 shows an example of a configuration of the smartphone 4 according to this embodiment.

The smartphone 4 has a fourth control unit 41, and a GPS unit 42. The smartphone 4 is carried by a driver of the vehicle 3. It should be noted that there may be one or a plurality of drivers for the vehicle 3. According to this embodiment, a case where there is one driver for the vehicle 3 is described.

The GPS unit 42 includes a receiver that receives GPS signal from the global positioning system (GPS) to acquire positional information the smartphone 4. The positional information includes latitude information and longitude information.

The fourth control unit 41 has a fourth processor 41A such as a CPU or an MPU, and a fourth memory 41B such as a ROM or a RAM. In addition to these devices, the fourth control unit 41 has, for example, an interface circuit for connecting a sensor or the like, a peripheral device and so on.

The fourth control unit 41 has a position obtaining unit 411, a determining unit 412, and a fourth transmitting/receiving unit 413. Specifically, the fourth processor 41A in the fourth control unit 41 executes a fourth control program stored in the fourth memory 41B to function as the position obtaining unit 411, the determining unit 412, and the fourth transmitting/receiving unit 413.

The fourth transmitting/receiving unit 413 transmits and receives various kinds of information to and from each of the first server apparatus 1 and the vehicle 3 over the network NW.

The fourth transmitting/receiving unit 413 receives, for example, start position information indicating a start position LS, start date-and-time information indicating a start date and time TS, parking position information indicating a parking position LE, and parking date-and-time information indicating a parking date and time TE from the vehicle 3.

The fourth transmitting/receiving unit 413 transmits, for example, approach information indicating an approach state AP and separation information indicating a separation state SP to the first server apparatus 1. The approach state AP indicates that the distance to the vehicle 3 is less than a predetermined distance. The separation state SP indicates that the distance to the vehicle 3 is greater than or equal to the predetermined distance.

The position obtaining unit 411 obtains positional information of the smartphone 4 from the GPS unit 42 at predetermined intervals. The predetermined interval is, for example, every 10 seconds.

Also, the position obtaining unit 411 obtains parking position information indicating a parking position LE and start position information indicating a start position LS from the vehicle 3 through the fourth transmitting/receiving unit 413.

The determining unit 412 receives parking date-and-time information indicating a parking date and time TE and start date-and-time information indicating a start date and time TS from the vehicle 3 through the fourth transmitting/receiving unit 413.

Also, during a period from the parking date and time TE to the start date and time TS, the determining unit 412 determines whether the distance between the smartphone 4 and the vehicle 3 is greater than or equal to a predetermined distance or not based on the positional information of the smartphone 4 and the parking position information indicating a parking position LE.

The predetermined distance is, for example, 10 m. The predetermined distance is set based on, for example, a time required for an initial activation of the application program in the second server apparatus 2.

If the determining unit 412 determines that the distance between the smartphone 4 and the vehicle 3 is not greater than or equal to the predetermined distance, the determining unit 412 transmits approach information indicating an approach state AP to the first server apparatus 1 through the fourth transmitting/receiving unit 413. For example, when the state that the distance between the smartphone 4 and the vehicle 3 is greater than or equal to the predetermined distance is changed to the state that the distance between the smartphone 4 and the vehicle 3 is less than the predetermined distance, the determining unit 412 transmits approach information indicating an approach state AP to the first server apparatus 1 through the fourth transmitting/receiving unit 413.

Also, if the determining unit 412 determines that the distance between the smartphone 4 and the vehicle 3 is greater than or equal to the predetermined distance, the determining unit 412 transmits separation information indicating a separation state SP to the first server apparatus 1 through the fourth transmitting/receiving unit 413. For example, when the state that the distance between the smartphone 4 and the vehicle 3 is less than the predetermined distance is changed to the state that the distance between the smartphone 4 and the vehicle 3 is greater than or equal to the predetermined distance, the determining unit 412 transmits separation information indicating a separation state SP to the first server apparatus 1 through the fourth transmitting/receiving unit 413.

Although the case is described according to this embodiment where the determining unit 412 transmits approach information indicating an approach state AP and separation information indicating a separation state SP to the first server apparatus 1, the determining unit 412 may transmit approach information indicating an approach state AP and separation information indicating a separation state SP to the second server apparatus 2. In this case, the processing in the first server apparatus 1 can be simplified, and the second server apparatus 2 can surely activate the personal authentication program.

[2-3. Configuration of First Server Apparatus]

Figure 4:
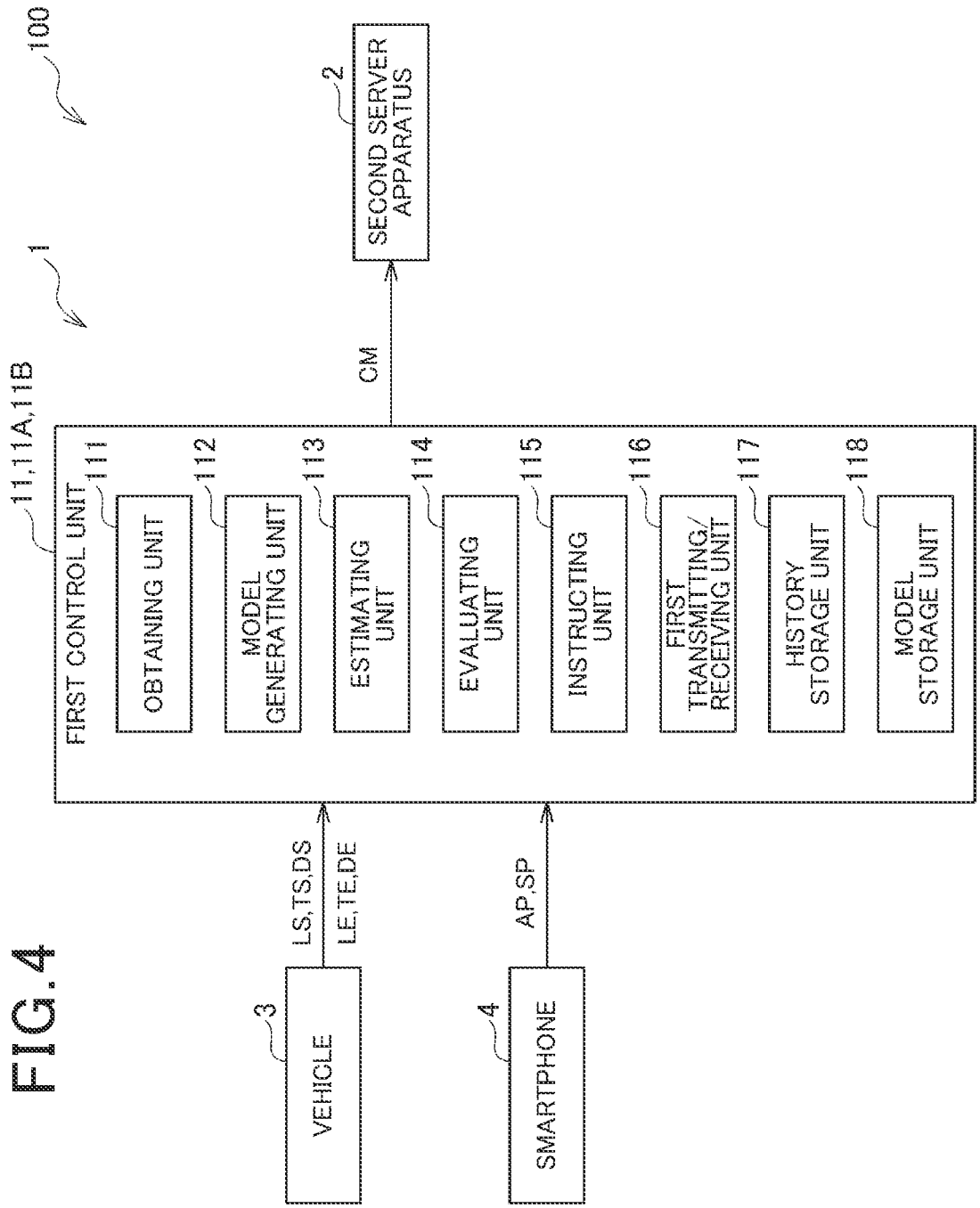
FIG. 4 shows an example of a configuration of a first server apparatus according to the embodiment.

FIG. 4 shows an example of a configuration of the first server apparatus 1 according to this embodiment.

The first server apparatus 1 is communicably connected to each of the second server apparatus 2, the vehicle 3, and the smartphone 4. The first server apparatus 1 has a first control unit 11.

The first control unit 11 has a first processor 11A such as a CPU or MPU, and a first memory 11B such as a ROM, a RAM, a hard disk drive (HDD) or a solid state drive (SDD).

In addition to these devices, the first control unit 11 has an interface circuit or the like for connecting a peripheral device and so on.

The first control unit 11 has an obtaining unit 111, a model generating unit 112, an estimating unit 113, an evaluating unit 114, an instructing unit 115, a first transmitting/receiving unit 116, a history storage unit 117, and a model storage unit 118. Specifically, the first processor 11A in the first control unit 11 executes a first control program stored in the first memory 11B to function as the obtaining unit 111, the model generating unit 112, the estimating unit 113, the evaluating unit 114, the instructing unit 115, and the first transmitting/receiving unit 116. Also, the first processor 11A in the first control unit 11 executes the first control program stored in the first memory 11B to cause the first memory 11B to function as the history storage unit 117 and the model storage unit 118.

The first transmitting/receiving unit 116 receives start position information indicating a start position LS, start date-and-time information indicating a start date and time TS, and start day-of-week information indicating a start day of the week DS from the vehicle 3. Also, the first transmitting/receiving unit 116 receives parking position information indicating a parking position LE, parking date-and-time information indicating a parking date and time TE and parking day-of-week information indicating a parking day of the week DE from the vehicle 3.

Also, the first transmitting/receiving unit 116 receives approach information indicating an approach state AP and separation information indicating a separation state SP from the smartphone 4.

Also, the first transmitting/receiving unit 116 transmits instruction information indicating an activation instruction CM to activate the personal authentication program to the second server apparatus 2.

The history storage unit 117 stores the start position information indicating a start position LS, start date-and-time information indicating a start date and time TS, and start day-of-week information indicating a start day of the week DS in association. Also, the history storage unit 117 stores the parking position information indicating a parking position LE, parking date-and-time information indicating a parking date and time TE and parking day-of-week information indicating a parking day of the week DE in association.

The model storage unit 118 stores a learned model MD. The learned model MD estimates a date and time at which the vehicle 3 is started.

A configuration of the learned model MD is described later with reference to FIGS. 6 to 8.

The obtaining unit 111 obtains the start position information indicating a start position LS, start date-and-time information indicating a start date and time TS, and start day-of-week information indicating a start day of the week DS from the vehicle 3 through the first transmitting/receiving unit 116 and records the obtained information in association in the history storage unit 117.

Also, the obtaining unit 111 obtains the parking position information indicating a parking position LE, parking date-and-time information indicating a parking date and time TE and parking day-of-week information indicating a parking day of the week DE from the vehicle 3 through the first transmitting/receiving unit 116 and records the obtained information in association in the history storage unit 117.

Also, the obtaining unit 111 obtains approach information indicating an approach state AP and separation information indicating a separation state SP from the smartphone 4 through the first transmitting/receiving unit 116.

The model generating unit 112 generates a learned model MD based on the information stored in the history storage unit 117 and records the generated learned model MD in the model storage unit 118. The information stored in the history storage unit 117 is the start position information indicating a start position LS, start date-and-time information indicating a start date and time TS, start day-of-week information indicating a start day of the week DS, parking position information indicating a parking position LE, parking date-and-time information indicating a parking date and time TE and parking day-of-week information indicating a parking day of the week DE.

The model generating unit 112 generates a learned model MD by performing cluster analysis on the start position information for each of days of the week indicated in the start day-of-week information. Hereinafter, the cluster generated by performing cluster analysis on the start position information may be called a "position cluster SN" (where N is an integer).

The position cluster SN is described later with reference to FIGS. 6 and 7.

Also, the model generating unit 112 generates a learned model MD by performing cluster analysis on start date-and-time information for each of days of the week indicated by the start day-of-week information. Hereinafter, the cluster generated by performing cluster analysis on the start date-and-time information may be called a "time cluster SNM" (where M is an integer).

The time cluster SNM is described later with reference to FIGS. 6 and 8.

Although, according to this embodiment, the model generating unit 112 generates a learned model MD by performing cluster analysis, embodiments of the present invention are not limited thereto. The model generating unit 112 is only required to generate a learned model MD through machine learning. The model generating unit 112 may also generate a learned model MD through, for example, deep learning.

Although, according to this embodiment, a configuration that further learns the learned model MD is not described, so-called reinforcement learning may be executed on the learned model MD. Also, the learned model MD may be updated every predetermined period. The predetermined period is, for example, three months.

The estimating unit 113 estimates a date and time at which the vehicle 3 is started when the obtaining unit 111 obtains the parking position information indicating a parking position LE, parking date-and-time information indicating a parking date and time TE and parking day-of-week information indicating a parking day of the week DE.

It should be noted that, when the obtaining unit 111 obtains the parking position information indicating a parking position LE and the parking date-and-time information indicating a parking date and time TE, the vehicle 3 has been parked at the parking position LE at the parking date and time TE. The estimating unit 113 estimates the date and time at which the vehicle 3 parked at the parking position LE is started first after the parking date and time TE.

The estimating unit 113 estimates a date and time at which the vehicle 3 is started based on the information stored in the history storage unit 117. It should be noted that the information stored in the history storage unit 117 is the start position information indicating a start position LS, start date-and-time information indicating a start date and time TS, start day-of-week information indicating a start day of the week DS, parking position information indicating a parking position LE, parking date-and-time information indicating a parking date and time TE and parking day-of-week information indicating a parking day of the week DE.

Specifically, the estimating unit 113 estimates a date and time at which the vehicle 3 is started by using the learned model MD. The learned model MD estimates a date and time at which the vehicle 3 is started based on the parking position information indicating a parking position LE, parking date-and-time information indicating a parking date and time TE and parking day-of-week information indicating a parking day of the week DE obtained by the obtaining unit 111.

The evaluating unit 114 evaluates a precision of estimation of the date and time at which the vehicle 3 is started by the estimating unit 113.

Specifically, the evaluating unit 114 determines whether the precision of estimation of the start date and time TS by the estimating unit 113 is lower than or equal to a predetermined precision or not.

The evaluating unit 114 determines that the precision of estimation of a start date and time TS is lower than or equal to a predetermined precision if, for example, a standard deviation σNM of the time cluster SNM corresponding to the date and time at which the vehicle 3 is started is higher than or equal to a threshold value σS. The evaluating unit 114 determines that the precision of estimation of a start date and time TS is not lower than or equal to a predetermined precision if, for example, the standard deviation σNM of the time cluster SNM corresponding to the date and time at which the vehicle 3 is started is lower than the threshold value σS.

The threshold value σS is determined in accordance with, for example, a waiting time TW from a time when the personal authentication program in the second server apparatus 2 is activated. The waiting time TW indicates a time for shifting from an activation state to a stop state in a case where authentication processing is not executed after the personal authentication program in the second server apparatus 2 is activated. The waiting time TW is, for example, 30 minutes, and the threshold value σS is, for example, 15 minutes.

The standard deviation σNM is described later with reference to FIG. 8.

The instructing unit 115 transmits instruction information indicating an activation instruction CM to activate the personal authentication program to the second server apparatus 2 in accordance with an estimation result by the estimating unit 113. The instructing unit 115 instructs the second server apparatus 2 to activate the personal authentication program, for example, at a time a predetermined period of time before the date and time at which the vehicle 3 is started, which is estimated by the estimating unit 113. The predetermined period of time is, for example, five minutes. In other words, the instructing unit 115 instructs the second server apparatus 2 to activate the personal authentication program at an activation date and time TU. The activation date and time TU indicates a date and time a predetermined period of time before the date and time at which the vehicle 3 is started, which is estimated by the estimating unit 113.

Also, if the evaluating unit 114 evaluates that the precision of estimation is lower than or equal to the predetermined precision, the instructing unit 115 transmits instruction information indicating an activation instruction CM to activate the personal authentication program to the second server apparatus 2 in accordance with a determination result by the determining unit 412 in the smartphone 4. Specifically, if the determining unit 412 in the smartphone 4 determines that the distance between the smartphone 4 and the vehicle 3 is not greater than or equal to the predetermined distance, the first transmitting/receiving unit 116 receives approach information indicating an approach state AP. When the first transmitting/receiving unit 116 receives the approach information indicating an approach state AP, the instructing unit 115 transmits instruction information indicating an activation instruction CM to activate the personal authentication program to the second server apparatus 2. In this case, the activation date and time TU is a date and time at which the instruction information indicating the activation instruction CM is transmitted. In other words, the activation instruction CM is an instruction that requests the second server apparatus 2 to activate the personal authentication program immediately after receiving the activation instruction CM.

[2-4. Configuration of Second Server Apparatus]

Figure 5:
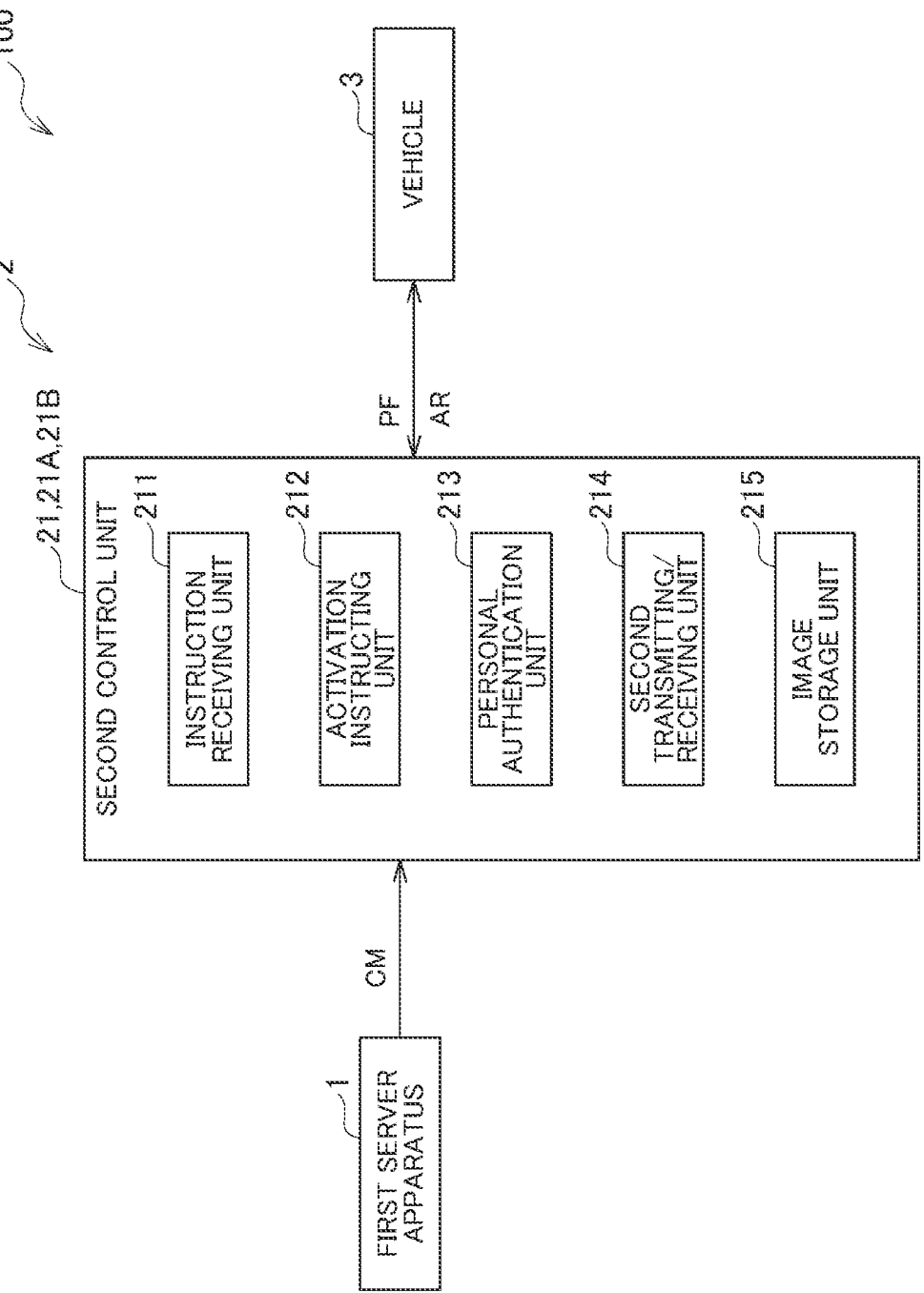
FIG. 5 shows an example of a configuration of a second server apparatus according to the embodiment.

FIG. 5 shows an example of a configuration of the second server apparatus 2 according to this embodiment.

The second server apparatus 2 is communicably connected to each of the first server apparatus 1 and the vehicle 3. The second server apparatus 2 has a second control unit 21.

The second control unit 21 has a second processor 21A such as a CPU or MPU, and a second memory 21B such as a ROM, a RAM, a hard disk drive (HDD) or a solid state drive (SDD). In addition to these devices, the second control unit 21 has an interface circuit or the like for connecting a peripheral device and so on.

The second control unit 21 has an instruction receiving unit 211, an activation instructing unit 212, a personal authentication unit 213, a second transmitting/receiving unit 214, and an image storage unit 215. Specifically, the second processor 21A in the second control unit 21 executes a second control program stored in the second memory 21B to function as the instruction receiving unit 211, the activation instructing unit 212, the personal authentication unit 213 and the second transmitting/receiving unit 214. Also, the second processor 21A in the second control unit 21 executes the second control program stored in the second memory 21B to cause the second memory 21B to function as the image storage unit 215.

The second transmitting/receiving unit 214 receives instruction information indicating an activation instruction CM to activate the personal authentication program from the first server apparatus 1.

Also, the second transmitting/receiving unit 214 receives facial image information indicating a facial image PF of a driver from the vehicle 3. Also, the second transmitting/receiving unit 214 transmits authentication result information indicating an authentication result AR to the vehicle 3.

The image storage unit 215 stores a facial image PFA of the registered driver of the vehicle 3. The facial image PFA is recorded in the image storage unit 215 by, for example, a dealer when, for example, the vehicle 3 is purchased.

The instruction receiving unit 211 receives the instruction information indicating an activation instruction CM from the first server apparatus 1 through the second transmitting/receiving unit 214. The activation instruction CM is an instruction to activate the personal authentication program at an activation date and time TU.

The activation instructing unit 212 determines whether it has reached the activation date and time TU or not. If it is determined that it has reached the activation date and time TU, the activation instructing unit 212 then instructs the personal authentication unit 213 to start the personal authentication program.

The personal authentication unit 213 activates the personal authentication program in accordance with the instruction from the activation instructing unit 212. Then, through the second transmitting/receiving unit 214, facial image information indicating the facial image PF of the driver from the vehicle 3 is received. When the facial image information indicating the facial image PF is received, the personal authentication unit 213 executes personal authentication processing with the facial image PF. In other words, by using image processing or the like, the personal authentication unit 213 authenticates whether the person in the facial image PF is matched with the person in the facial image PFA stored in the image storage unit 215. Then, the personal authentication unit 213 transmits authentication result information indicating an authentication result AR to the vehicle 3 through the second transmitting/receiving unit 214.

3. Configuration of Learned Model

Next, the learned model MD is described with reference to FIGS. 6 to 8.

Figure 6:
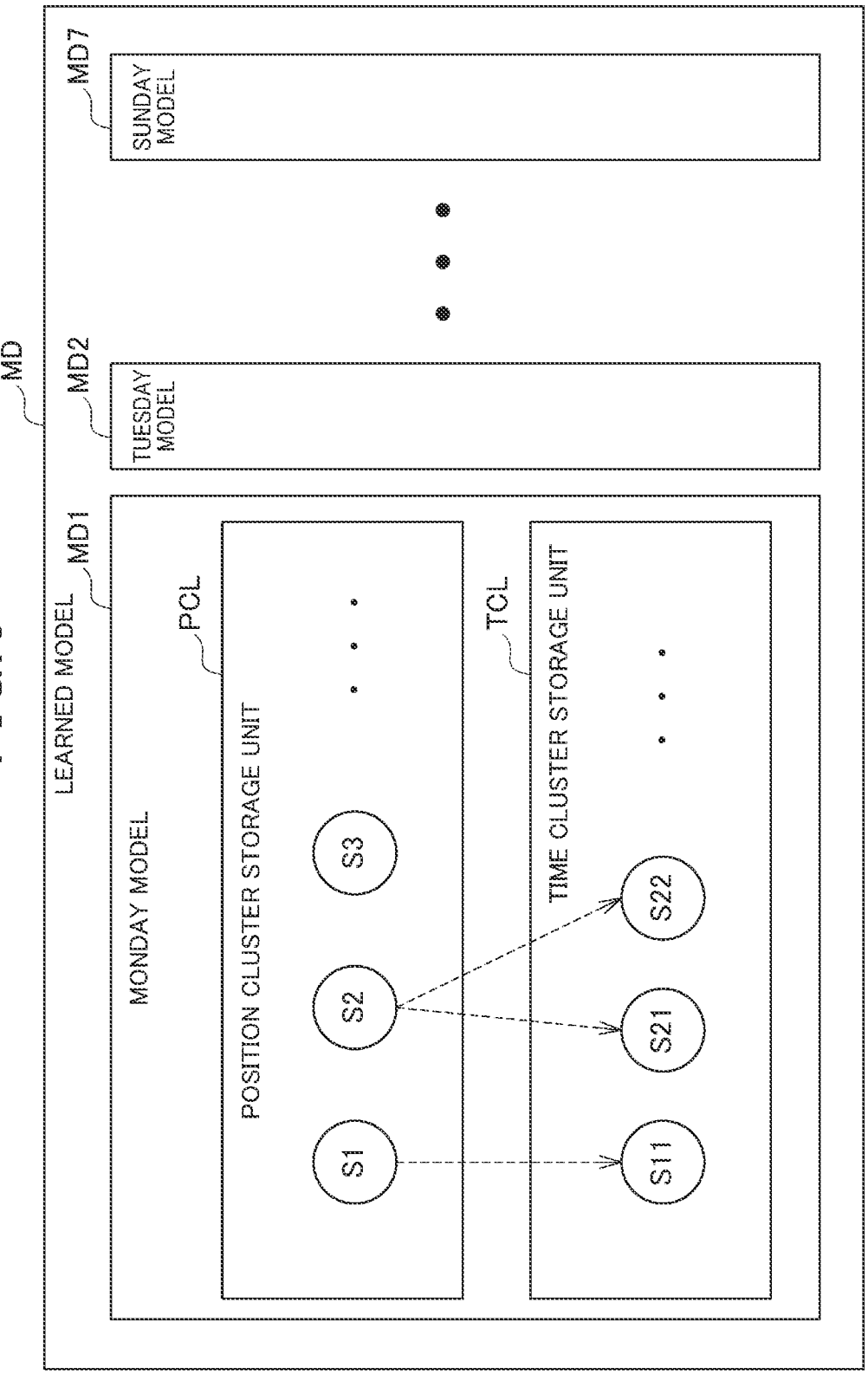
FIG. 6 shows an example of a configuration of a learned model.

FIG. 6 shows an example of a configuration of the learned model MD.

As shown in FIG. 6, the learned model MD includes a Monday model MD1, a Tuesday model MD2, a Wednesday model MD3, a Thursday model MD4, a Friday model MD5, a Saturday model MD6, and a Sunday model MD7.

Each of the Monday model MD1, Tuesday model MD2, Wednesday model MD3, Thursday model MD4, Friday model MD5, Saturday model MD6 and Sunday model MD7 corresponds to a day of the week indicated by the start day of the week DS.

Each of the Monday model MD1 to Sunday model MD7 has a position cluster storage unit PCL and a time cluster storage unit TCL.

The Monday model MD1 is described below.

The position cluster storage unit PCL includes a position cluster S1, a position cluster S2, and a position cluster S3.

Each of the position cluster S1 to the position cluster S3 is a cluster generated by performing cluster analysis on start positions LS with Monday as the start day of the week DS. Specifically, as described with reference to FIG. 7, it is a cluster generated by performing cluster analysis on start positions LS with the longitude of the start position LS as its horizontal axis and the latitude of the start position LS as its vertical axis.

Each of the position cluster S1 to the position cluster S3 is described later with reference to FIG. 7.

The time cluster storage unit TCL includes a time cluster S11, a time cluster S21, and a time cluster S22.

The time cluster S11 corresponds to the position cluster S1, and the time cluster S21 and the time cluster S22 correspond to the position cluster S2.

Each of the time cluster S11, the time cluster S21 and the time cluster S22 is described later with reference to FIG. 8.

Based on the parking position LE, parking date and time TE and parking day of the week DE obtained by the obtaining unit 111, the estimating unit 113 estimates a start date and time TS in the following manner.

First, based on the parking day of the week DE obtained by the obtaining unit 111, the estimating unit 113 selects one model from the Monday model MD1, the Tuesday model MD2, the Wednesday model MD3, the Thursday model MD4, the Friday model MD5, the Saturday model MD6 and the Sunday model MD7. For example, if the parking day of the week DE is Monday, the Monday model MD1 is selected.

Next, based on the parking position LE obtained by the obtaining unit 111, the estimating unit 113 extracts one position cluster SN from position clusters SN included in the Monday model MD1. Because the parking position LE obtained by the obtaining unit 111 is matched with the start position LS that is a position where the vehicle 3 is started next, the estimating unit 113 extracts, for example, the position cluster SN including the parking position LE.

Next, based on the parking date and time TE obtained by the obtaining unit 111, the estimating unit 113 extracts one time cluster SNM from time clusters SNM corresponding to the extracted position cluster SN. Because the start date and time TS that is a date and time at which the vehicle 3 is started next is after the parking date and time TE obtained by the obtaining unit 111, the estimating unit 113 extracts, for example, the time cluster SNM after the time included in the parking date and time TE.

Then, the estimating unit 113 estimates an average time AVNM of the extracted time cluster SNM as the start date and time TS.

Each of the time cluster SNM and the average time AVNM is described later with reference to FIG. 8.

In this way, because the start date and time TS is estimated for each day of the week with reference to the position cluster SN and the time cluster SNM generated by cluster analysis, a proper start date and time TS can be estimated with the simple configuration.

Figure 7:
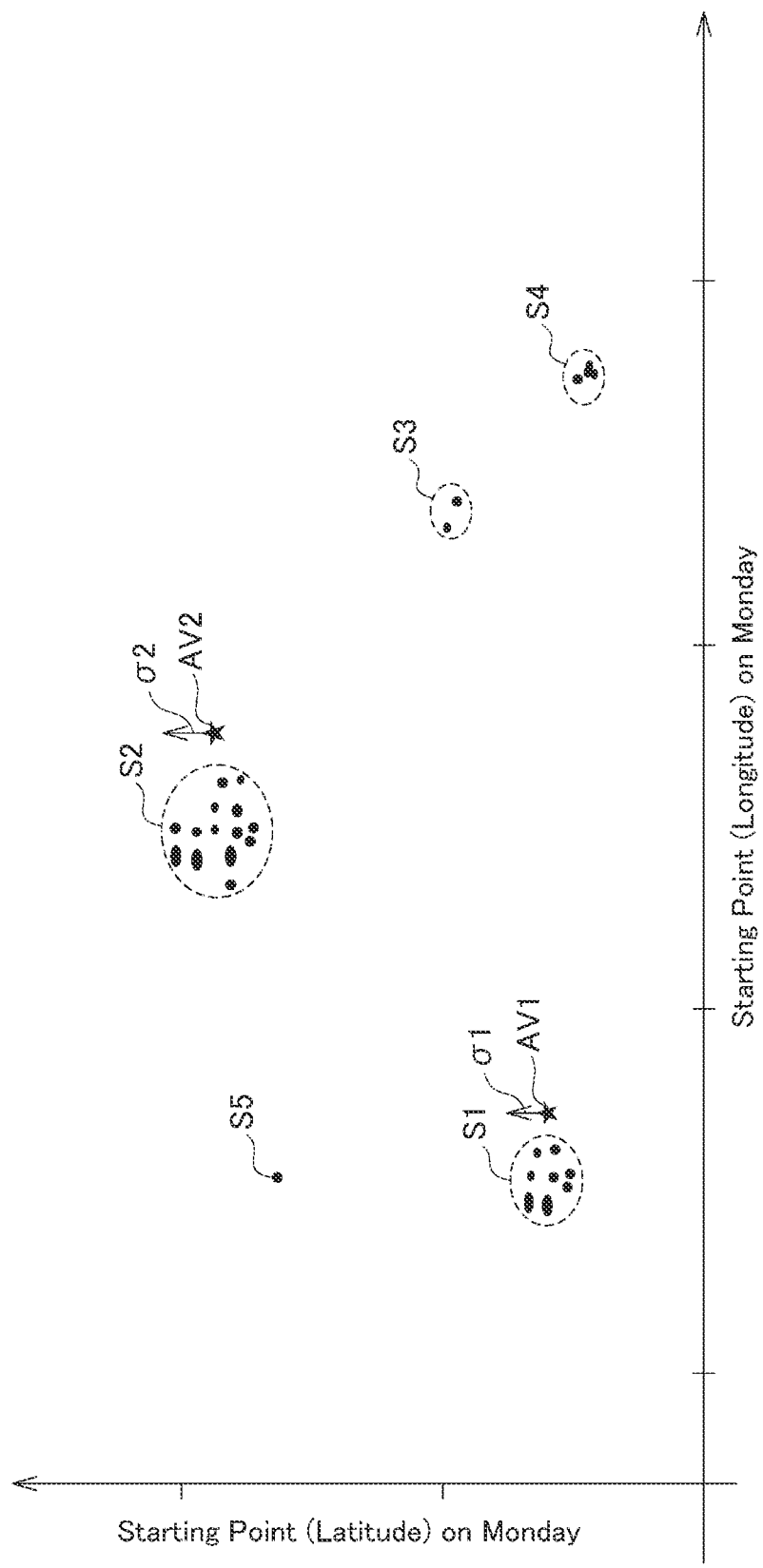
FIG. 7 is a graph showing a specific example of a position cluster on Monday.

FIG. 7 is a graph showing a specific example of the position cluster SN on Monday.

FIG. 7 has a horizontal axis indicating a longitude of the start position LS and a vertical axis indicating a latitude of the start position LS.

A position cluster S1 to a position cluster S5 shown in FIG. 7 are clusters generated by performing cluster analysis on longitudes and latitudes of the start positions LS in a case where the start day of the week DS is Monday.

The position cluster S1 indicates, for example, a position of a home of a driver of the vehicle 3.

An average position AV1 indicates an average position of the start positions LS included in the position cluster S1. Specifically, the average position AV1 indicates an average latitude of the start positions LS included in the position cluster S1 and an average longitude of the start positions LS included in the position cluster S1. FIG. 7 shows the position of the average position AV1 at a position shifted in the positive direction of the horizontal axis for convenience.

A standard deviation σ1 indicates a standard deviation σ of the start positions LS included in the position cluster S1. The standard deviation σ1 is, for example, 30 m.

The position cluster S2 indicates, for example, a position of a place of work of the driver of the vehicle 3.

An average position AV2 indicates an average position of the start positions LS included in the position cluster S2. Specifically, the average position AV2 indicates an average latitude of the start positions LS included in the position cluster S2 and an average longitude of the start positions LS included in the position cluster S2. FIG. 7 shows the position of the average position AV2 at a position shifted in the positive direction of the horizontal axis for convenience.

A standard deviation σ2 indicates a standard deviation σ of the start positions LS included in the position cluster S2. The standard deviation σ2 is, for example, 70 m.

The position cluster S3 is, for example, a restaurant where the driver of the vehicle 3 has lunch.

According to this embodiment, the position cluster S1 to the position cluster S5 may be called a "position cluster SN".

Figure 8:
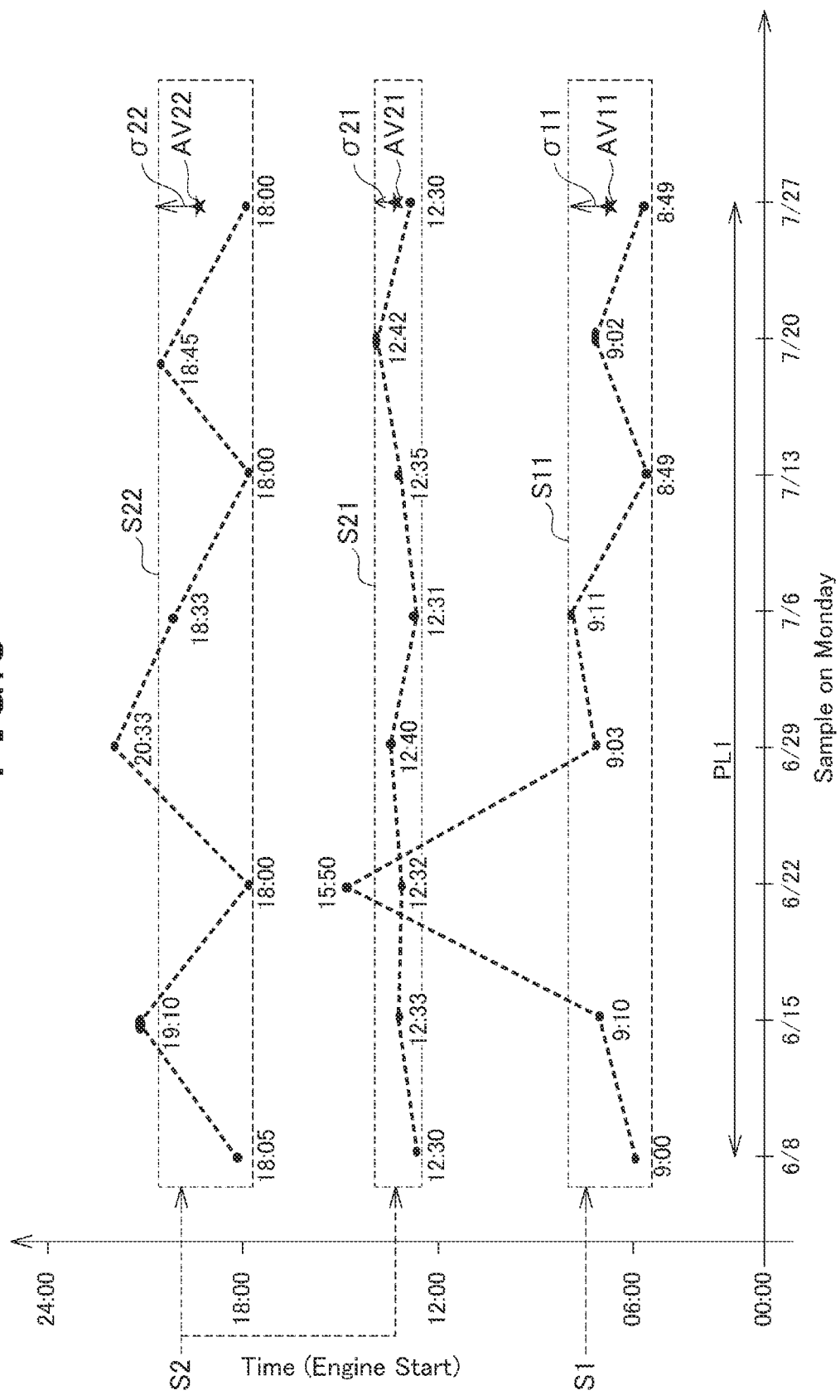
FIG. 8 is a graph showing a specific example of a time cluster on Monday.

FIG. 8 is a graph showing a specific example of the time cluster SNM on Monday.

FIG. 8 has a horizontal axis indicating a month and day-of-month of the start date and time TS and a vertical axis indicating a time included in the start date and time TS, that is, a start time US.

A time cluster S11, a time cluster S21 and a time cluster S22 shown in FIG. 8 are clusters generated by performing cluster analysis on the start times US included in the start dates and times TS corresponding to the start positions LS included in the position cluster S1 and position cluster S2 shown in FIG. 7.

Also, a learning period PL1 indicates a period in which information for generating the time cluster SNM shown in FIG. 8 is obtained. Also, the learning period PL1 indicates a period in which information for generating the position cluster SN shown in FIG. 7 is obtained.

The information for generating the time cluster SNM and the information for generating the position cluster SN are start position information indicating a start position LS, start date-and-time information indicating a start date and time TS, start day-of-week information indicating a start day of the week DS, parking position information indicating a parking position LE, parking date-and-time information indicating a parking date and time TE, and parking day-of-week information indicating a parking day of the week DE. The learning period PL1 is, for example, a period from Jun. 8 to Jul. 27, 2020.

The time cluster S11 is a cluster generated by performing cluster analysis on times, that is, the start times US included in the start date and time TS corresponding to the position cluster S1 shown in FIG. 7.

An average time AV11 is an average value of the start times US included in the time cluster S11 and is, for example, 9:03.

A standard deviation σ11 indicates a standard deviation σ of the start times US included in the time cluster S11 and is, for example, 10 minutes.

The time cluster S21 is a cluster generated by performing cluster analysis on start times US corresponding to the position cluster S2 shown in FIG. 7.

An average time AV21 is an average value of the start times US included in the time cluster S21 and is, for example, 12:33.

A standard deviation σ21 indicates a standard deviation σ of the start times US included in the time cluster S21 and is, for example, 10 minutes.

The time cluster S22 is a cluster generated by performing cluster analysis on start times US corresponding to the position cluster S2 shown in FIG. 7.

An average time AV22 is an average value of the start times US included in the time cluster S22 and is, for example, 18:30.

A standard deviation σ22 indicates a standard deviation σ of the start times US included in the time cluster S22 and is, for example, 60 minutes.

The time cluster S11, time cluster S21 and time cluster S22 may be called a "time cluster SNM" according to this embodiment. The time cluster SNM corresponds to the position cluster SN.

In this way, a position cluster SN is generated by performing cluster analysis for each day of the week, and a time cluster SNM is generated by performing cluster analysis on the start times US corresponding to the generated position cluster SN. Therefore, the time cluster SNM corresponding to the start day of the week DS, the start position LS and the start date and time TS can be generated. Therefore, based on the time cluster SNM, the start time US can be properly estimated.

4. Processing of Information Processing System

Next, an outline of processing of the information processing system 100 is described with reference to FIG. 9.

Figure 9:
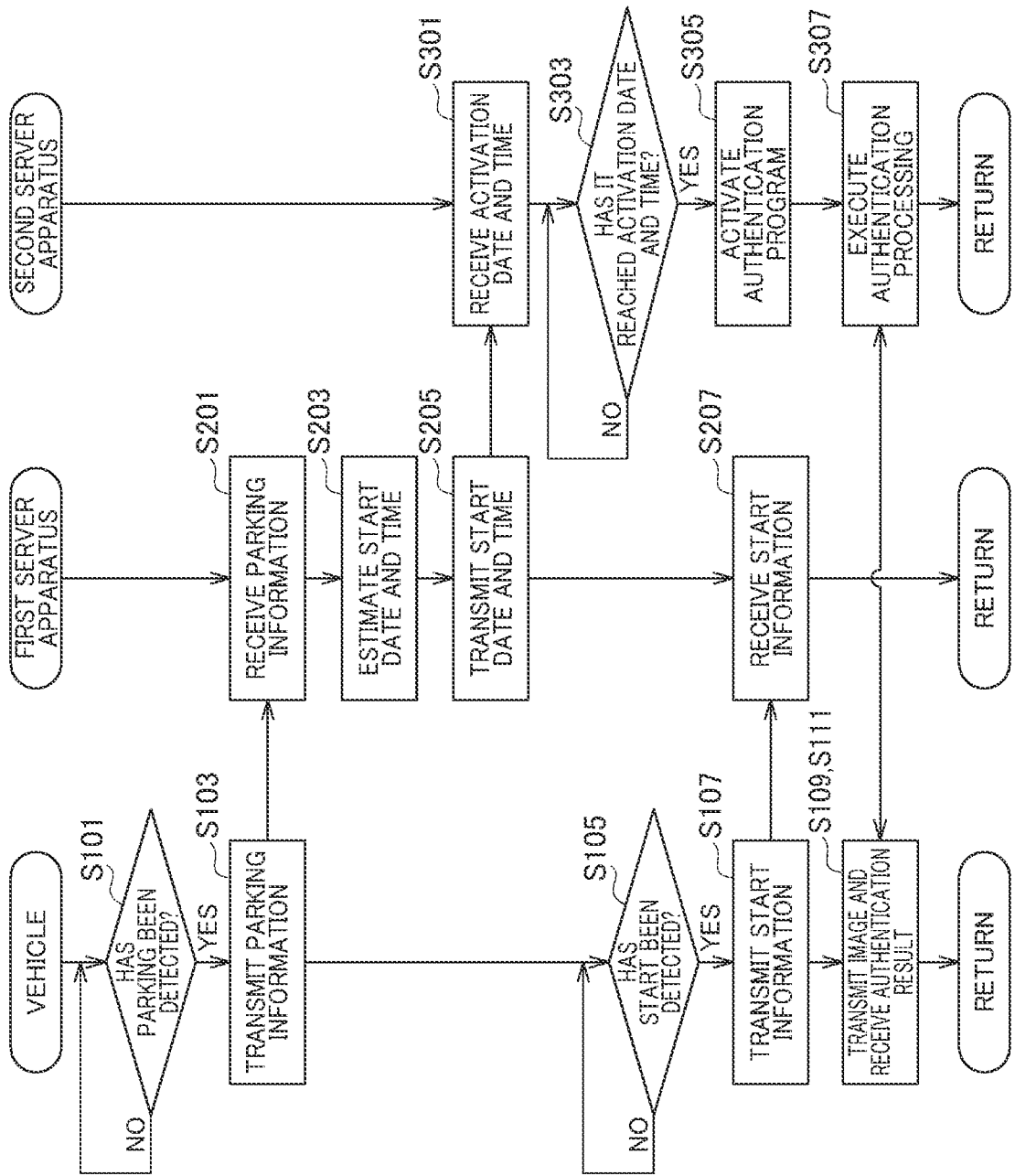
FIG. 9 is a flowchart showing an example of an outline of processing of the information processing system.

FIG. 9 is a flowchart showing an example of an outline of processing of the information processing system 100.

Referring to FIG. 9, processing in step S101 to step S111 indicates processing by the third control unit 31 in the vehicle 3. Also, processing in step S201 to step S207 indicates processing by the first control unit 11 in the first server apparatus 1. Also, processing in step S301 to step S307 indicates processing by the second control unit 21 in the second server apparatus 2.

It should be noted that a case where a learned model MD is generated in advance is described with reference to FIG. 9.

First, in step S101, the parking detecting unit 312 in the third control unit 31 in the vehicle 3 determines whether a fact that the vehicle 3 has been parked has been detected or not.

If the parking detecting unit 312 determines that the fact that the vehicle 3 has been parked has not been detected (NO in step S101), the processing has a waiting state. If the parking detecting unit 312 determines that the fact that the vehicle 3 has been parked has been detected (YES in step S101), the processing moves to step S103.

Then, in step S103, the parking detecting unit 312 in the third control unit 31 in the vehicle 3 generates parking information and transmits the generated parking information to the first server apparatus 1. It should be noted that the parking information is parking position information indicating a parking position LE, parking date-and-time information indicating a parking date and time TE, and parking day-of-week information indicating a parking day of the week DE.

Next, in step S201, the obtaining unit 111 in the first control unit 11 in the first server apparatus 1 obtains the parking information from the third control unit 31 in the vehicle 3.

Next, in step S203, the estimating unit 113 in the first control unit 11 in the first server apparatus 1 estimates a date and time at which the vehicle 3 is started based on the parking information.

Next, in step S205, the instructing unit 115 in the first control unit 11 in the first server apparatus 1 instructs the second server apparatus 2 to activate the personal authentication program at a time a predetermined period of time before the date and time at which the vehicle 3 is started, which is estimated by the estimating unit 113.

Next, in step S301, the instruction receiving unit 211 in the second control unit 21 in the second server apparatus 2 receives the instruction information indicating an activation instruction CM from the first control unit 11 in the first server apparatus 1. The activation instruction CM includes an activation date and time TU. The activation date and time TU indicates a date and time at which the personal authentication program is activated.

Next, in step S303, the activation instructing unit 212 in the second control unit 21 in the second server apparatus 2 determines whether it has reached the activation date and time TU or not.

If the activation instructing unit 212 determines that it has not reached the activation date and time TU (NO in step S303), the processing has a waiting state. If the activation instructing unit 212 determines that it has reached the activation date and time TU (YES in step S303), the processing moves to step S305.

Then, in step S305, the activation instructing unit 212 instructs the personal authentication unit 213 to activate the personal authentication program, and the personal authentication unit 213 activates the personal authentication program in accordance with the instruction from the activation instructing unit 212.

On the other hand, in step S105, the start detecting unit 311 in the third control unit 31 in the vehicle 3 determines whether a fact that the vehicle 3 has been started has been detected or not.

If the start detecting unit 311 determines that the fact that the vehicle 3 has been started has not been detected (NO in step S105), the processing has a waiting state. If the start detecting unit 311 determines that the fact that the vehicle 3 has been started has been detected (YES in step S105), the processing moves to step S107.

Then, in step S107, the start detecting unit 311 transmits start information to the first server apparatus 1. It should be noted that the start information is start position information indicating a start position LS, start date-and-time information indicating a start date and time TS, and start day-of-week information indicating a start day of the week DS.

Next, in step S207, the obtaining unit 111 in the first control unit 11 in the first server apparatus 1 obtains the start information from the third control unit 31 in the vehicle 3.

Also, in step S109, the authenticating unit 314 in the third control unit 31 in the vehicle 3 obtains a facial image PF from the imaging unit 323 and transmits the obtained facial image PF to the second server apparatus 2.

Next, in step S307, the personal authentication unit 213 in the second control unit 21 in the second server apparatus 2 receives the facial image PF and executes personal authentication processing with the facial image PF. Then, the personal authentication unit 213 transmits an authentication result AR to the vehicle 3.

Next, in step S111, the authenticating unit 314 in the third control unit 31 in the vehicle 3 receives the authentication result AR from the second server apparatus 2 and displays the authentication result AR on the LCD of the touch panel 324. After that, the processing returns to step S101.

In this way, the estimating unit 113 in the first control unit 11 in the first server apparatus 1 estimates a date and time at which the vehicle 3 is started based on parking information, and, based on the estimated date and time, the instructing unit 115 instructs the second server apparatus 2 to activate the personal authentication program. Therefore, the second server apparatus 2 can activate the personal authentication program at a proper date and time. As a result, the convenience of the driver can be improved.

5. Processing of First Server Apparatus

Next, processing of the first control unit 11 in the first server apparatus 1 is described with reference to FIG. 10 and FIG. 11.

Figure 10:
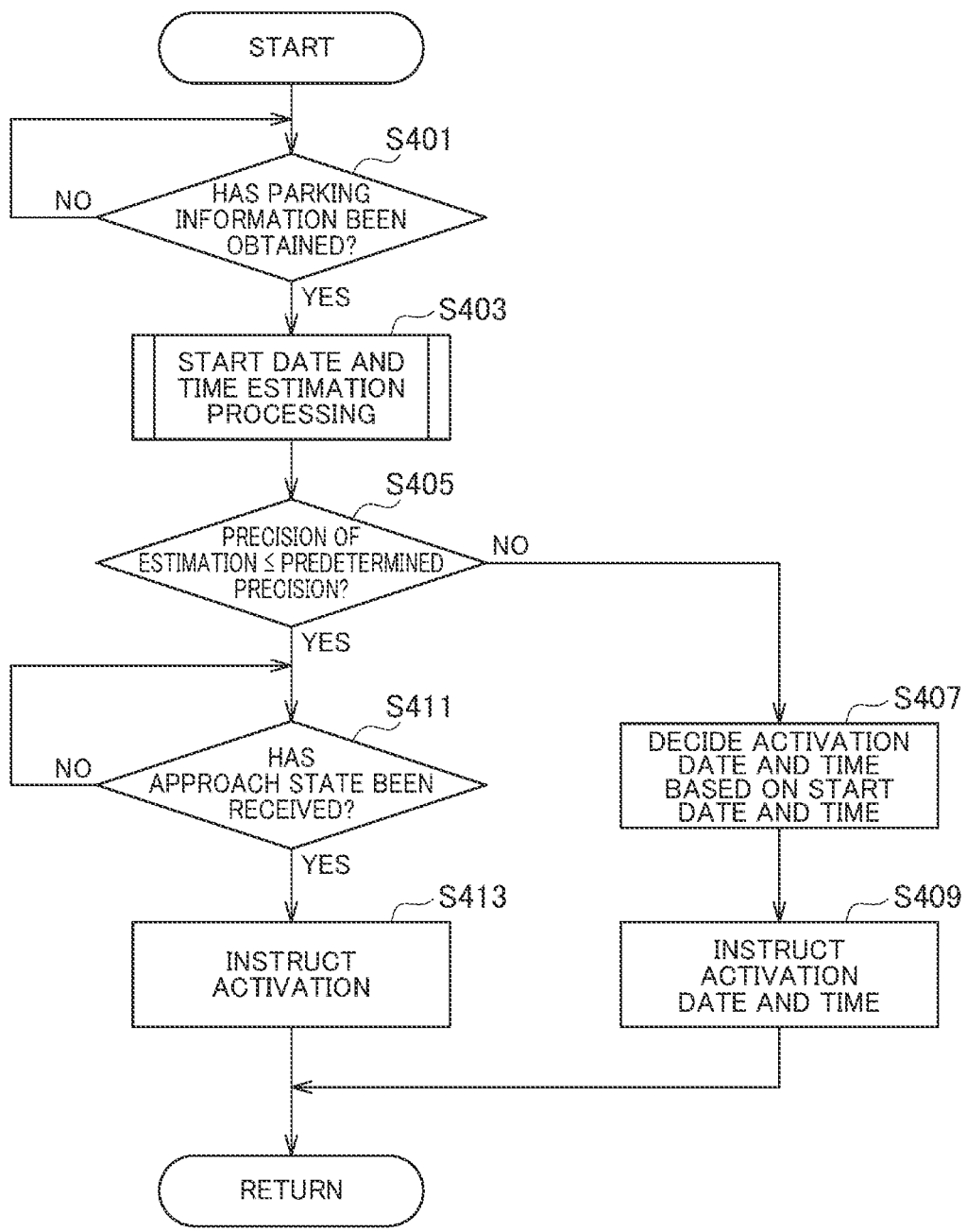
FIG. 10 is a flowchart showing an example of processing by the first server apparatus.

FIG. 10 is a flowchart showing an example of processing of the first control unit 11 in the first server apparatus 1.

First, in step S401, the obtaining unit 111 determines whether parking information has been obtained or not. It should be noted that the parking information is parking position information indicating a parking position LE, parking date-and-time information indicating a parking date and time TE and parking day-of-week information indicating a parking day of the week DE.

If the obtaining unit 111 determines that parking information has not been obtained (NO in step S401), the processing has a waiting state. If the obtaining unit 111 determines that parking information has been obtained (YES in step S401), the processing moves to step S403.

Then, in step S403, the estimating unit 113 executes "start date and time estimation processing". The "start date and time estimation processing" indicates processing of estimating a date and time at which the vehicle 3 is started, that is, a start date and time TS. The "start date and time estimation processing" is described later with reference to FIG. 11.

Next, in step S405, the evaluating unit 114 determines whether the precision of estimation of the start date and time TS is lower than or equal to a predetermined precision or not.

If the evaluating unit 114 determines that the precision of estimation of the start date and time TS is lower than or equal to the predetermined precision (YES in step S405), the processing moves to step S411. If the evaluating unit 114 determines that the precision of estimation of the start date and time TS is not lower than or equal to the predetermined precision (NO in step S405), the processing moves to step S407.

Then, in step S407, the instructing unit 115 decides an activation date and time TU for the personal authentication program in the second server apparatus 2 based on the start date and time TS estimated by the estimating unit 113.

Next, in step S409, the instructing unit 115 transmits, to the second server apparatus 2, an activation instruction CM to activate the personal authentication program at the activation date and time TU. After that, the processing returns to step S401.

If the evaluating unit 114 determines that the precision of estimation of the start date and time TS is lower than or equal to a predetermined precision (YES in step S405), the instructing unit 115 in step S411 determines whether information indicating an approach state AP has been received from the smartphone 4 or not.

If the instructing unit 115 determines that the information indicating the approach state AP has not been received from the smartphone 4 (NO in step S411), the processing has a waiting state. If the instructing unit 115 determines that the information indicating an approach state AP has been received from the smartphone 4 (YES in step S411), the processing moves to step S413.

Then, in step S413, the instructing unit 115 transmits, to the second server apparatus 2, instruction information indicating an activation instruction CM to activate the personal authentication program. After that, the processing returns to step S401.

In this way, if the precision of estimation of the start date and time TS is lower than or equal to the predetermined precision, the instructing unit 115 transmits the instruction information indicating the activation instruction CM to activate the personal authentication program to the second server apparatus 2 based on the information indicating an approach state AP from the smartphone 4. Therefore, even if the precision of estimation of the start date and time TS is lower than or equal to the predetermined precision, the second server apparatus 2 can be caused to activate the personal authentication program at a proper time.

Figure 11:
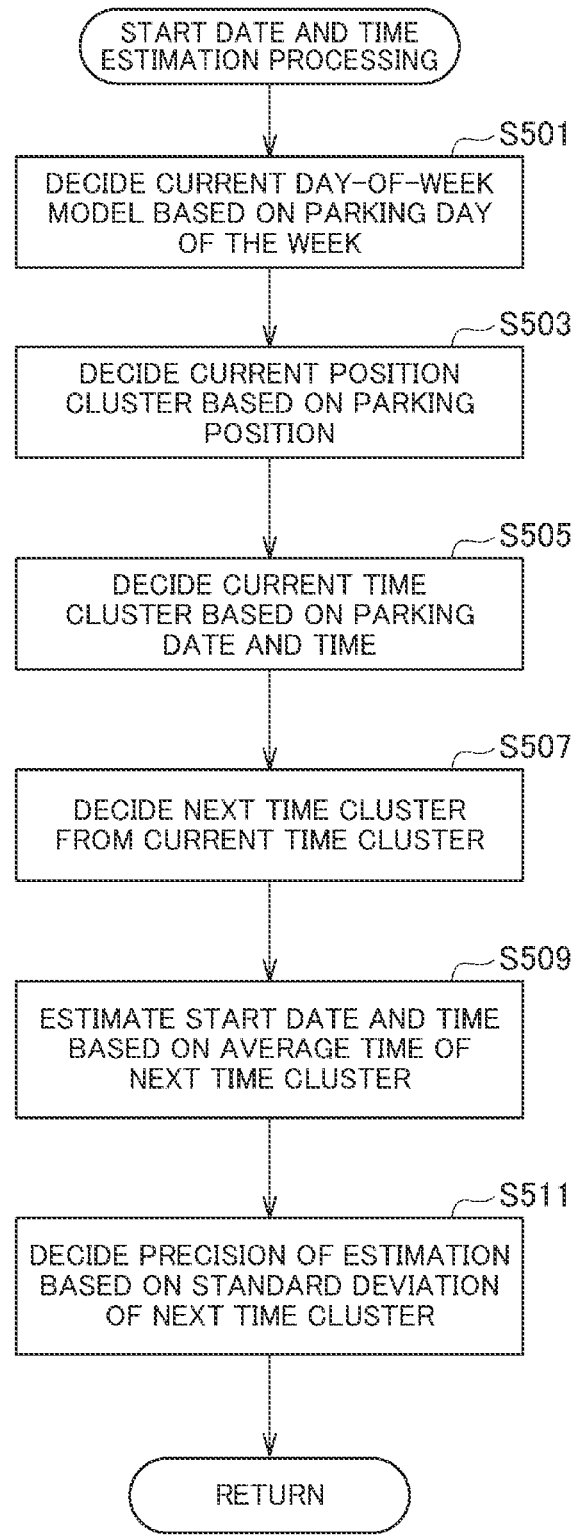
FIG. 11 is a flowchart showing an example of start date-and-time estimation processing by the first server apparatus.

FIG. 11 is a flowchart showing an example of the start date and time estimation processing in the first server apparatus 1.

First, in step S501, the estimating unit 113 decides a current day-of-week model based on the parking day of the week DE obtained by the obtaining unit 111. The "current day-of-week model" refers to a model corresponding to the parking day of the week DE. For example, when the parking day of the week DE is Monday, the current day-of-week model is the Monday model MD1, and when the parking day of the week DE is Tuesday, the current day-of-week model is the Tuesday model MD2.

Next, in step S503, the estimating unit 113 decides a current position cluster SN based on a parking position LE. The current position cluster SN is a position cluster SN including the parking position LE among the position clusters SN included in the current day-of-week model.

Next, in step S505, the estimating unit 113 decides a current time cluster SNM based on a parking date and time TE. The current time cluster SNM is a time cluster SNM before the time of the parking date and time TE among the time clusters SNM corresponding to the current position cluster SN and is a time cluster SNM that is the closest to the time of the parking date and time TE.

In other words, although the vehicle 3 has been parked at the parking date and time TE, the time cluster SNM including the start date and time TS of the start before the parking is called "current time cluster SNM".

Next, in step S507, the estimating unit 113 decides a next time cluster SNM from the current time cluster SNM. The next time cluster SNM is a time cluster SNM at a time after the time of the current time cluster SNM among the time clusters SNM corresponding to the position cluster SN including the current time cluster SNM.

If the current time cluster SNM is the last time cluster SNM of the time clusters SNM corresponding to the current position cluster SN, the estimating unit 113 decides a next time cluster SNM in the following manner.

That is, the estimating unit 113 decides a next day-of-week model corresponding to the next day of the week of the day of the week corresponding to the current day-of-week model. For example, if the current day-of-week model is the Monday model MD1, the next day-of-week model is the Tuesday model MD2.

Next, the estimating unit 113 decides a current position cluster SN included in the next day-of-week model. The current position cluster SN is a position cluster SN including the parking position LE.

Next, the estimating unit 113 decides a next time cluster SNM among the time clusters SNM corresponding to the current position cluster SN. The next time cluster SNM is a time cluster SNM of a time after the time of the current time cluster SNM among the time clusters SNM corresponding to the current position cluster SN.

Next, in step S509, the estimating unit 113 estimates a next start date and time TS based on an average time AVNM of the next time cluster SNM.

Next, in step S511, the estimating unit 113 decides a precision of estimation based on the standard deviation σNM of the next time cluster SNM. After that, the processing returns to step S405 in FIG. 10.

In this way, the estimating unit 113 can estimate the next start date and time TS by using the position cluster SN and the time cluster SNM included in the learned model MD based on the parking position LE, parking date and time TE and the parking day of the week DE.

6. Configuration and Effects of this Embodiment

As described above, the first server apparatus 1 of this embodiment is communicably connected to each of the second server apparatus 2 having a server-less function and the vehicle 3 and includes the obtaining unit 111 obtaining, from the vehicle 3, start position information indicating a start position LS that is a position where the vehicle 3 has been started, start date-and-time information indicating a start date and time TS that is a date and time at which the vehicle 3 has been started, parking position information indicating a parking position LE that is a position where the vehicle 3 has been parked, and parking date-and-time information indicating a parking date and time TE that is a date and time at which the vehicle 3 has been parked, the estimating unit 113 estimating a date and time at which the vehicle 3 is started based on the start position LS, the start date and time TS, the parking position LE and the parking date and time TE, and the instructing unit 115 instructing the second server apparatus 2 to activate the personal authentication program in accordance with an estimation result by the estimating unit 113.

Therefore, because the estimating unit 113 estimates a date and time at which the vehicle 3 is started based on the start position LS, the start date and time TS, the parking position LE and the parking date and time TE, there is a possibility that the date and time at which the vehicle 3 is started can be properly estimated. Also, because the instructing unit 115 instructs the second server apparatus 2 to activate the personal authentication program in accordance with an estimation result by the estimating unit 113, there is a possibility that the personal authentication program can be activated at a proper date and time.

Also, when the obtaining unit 111 obtains the parking position information and the parking date-and-time information, the estimating unit 113 estimates a date and time at which the vehicle 3 is started.

Thus, there is a degree of freedom of time required for processing of estimating a date and time at which the vehicle 3 is started. Therefore, the first server apparatus 1 can be configured by a server apparatus having a server-less function. As a result, the cost of the first server apparatus 1 can be reduced.

Also, the obtaining unit 111 further obtains start day-of-week information indicating a start day of the week DS that is a day of the week on which the vehicle 3 has been started and parking day-of-week information indicating a parking day of the week DE that is a day of the week on which the vehicle 3 has been parked, and the estimating unit 113 estimates a date and time at which the vehicle 3 is started based on the start position LS, the start date and time TS, the start day of the week DS, the parking position LE, the parking date and time TE, and the parking day of the week DE.

Therefore, because the estimating unit 113 estimates a date and time at which the vehicle 3 is started based on the start position LS, the start date and time TS, the start day of the week DS, the parking position LE, the parking date and time TE, and the parking day of the week DE, the possibility that a date and time at which the vehicle is started can be properly estimated can be increased.

The first server apparatus 1 further includes the learned model MD estimating a date and time at which the vehicle 3 is started based on the parking position LE, the parking date and time TE and the parking day of the week DE, and the estimating unit 113 estimates a date and time at which the vehicle 3 is started by using the learned model MD.

Therefore, by properly generating the learned model MD, the estimating unit 113 can properly estimate a date and time at which the vehicle 3 is started.

The first server apparatus 1 further includes the model generating unit 112 generating the learned model MD, and the model generating unit 112 cluster-analyzes the start positions LS for each start day of the week DS, and the learned model MD includes the cluster-analyzed start positions LS.

Therefore, because the learned model MD includes the cluster-analyzed start positions LS, that is, the position clusters SN for each start day of the week DS, the learned model MD can be generated by dividing the learned model MD in accordance with the start positions LS for each start day of the week DS. By dividing the learned model MD in accordance with the start positions LS for each start day of the week DS, the transition of the start positions LS for each start day of the week DS can be patterned. Therefore, the learned model MD can be properly configured.

Also, the model generating unit 112 cluster-analyzes start times US included in the start dates and times TS for each start day of the week DS, and the learned model MD includes the cluster-analyzed start times US.

Therefore, because the learned model MD includes the cluster-analyzed start times US, that is, the time clusters SNM for each start day of the week DS, the learned model MD can be generated by dividing the learned model MD in accordance with the start times US for each start day of the week DS. Also, by dividing the learned model MD in accordance with the start times US for each start day of the week DS, the transition of the start times US for each start day of the week DS can be patterned. Therefore, the learned model MD can be properly configured.

Also, the first server apparatus 1 is further communicably connected to the smartphone 4 determining whether a distance to the vehicle 3 is greater than or equal to a threshold value or not, and the instructing unit 115 instructs the second server apparatus 2 to activate the personal authentication program in accordance with a determination result by the smartphone 4.

Therefore, because the instructing unit 115 instructs the second server apparatus 2 to activate the personal authentication program in accordance with a determination result by the smartphone 4 regarding whether the distance between the smartphone 4 and the vehicle 3 is greater than or equal to the threshold value or not, the personal authentication program can be surely activated at a proper time.

The first server apparatus 1 further includes the evaluating unit 114 evaluating a precision of estimation of a date and time at which the vehicle 3 is started by the estimating unit 113, and, if the evaluating unit 114 evaluates that the precision of estimation is lower than or equal to a predetermined precision, the instructing unit 115 instructs the second server apparatus 2 to activate the personal authentication program in accordance with a determination result by the smartphone 4.

Therefore, even if the precision of estimation of the date and time at which the vehicle 3 is started by the estimating unit 113 is lower than or equal to the predetermined precision, the personal authentication program can be surely activated at a proper time.

Also, the information processing system 100 of the aforementioned embodiment includes the second server apparatus 2 having a server-less function, the vehicle 3, and the first server apparatus 1 communicably connected to each of the second server apparatus 2 and the vehicle 3.

Therefore, the same operating effect as that of the first server apparatus 1 described above is exerted. In other words, because the estimating unit 113 estimates a date and time at which the vehicle 3 is started based on the start position LS, the start date and time TS, the parking position LE and the parking date and time TE, there is a possibility that the date and time at which the vehicle 3 is started can be properly estimated. Also, because the instructing unit 115 instructs the second server apparatus 2 to activate the personal authentication program in accordance with an estimation result by the estimating unit 113, there is a possibility that the personal authentication program can be activated at a proper date and time.

7. Other Embodiments

The aforementioned embodiment is merely an example of one embodiment of the present invention, and variations and applications thereof can be arbitrarily made without departing from the spirit and scope of the present invention.

For example, each of FIG. 2 to FIG. 5 shows the constituent elements divided based on main processing details for easy understanding of the present invention, but the constituent elements can be divided into more constituent elements based on the processing details. Also, the division can be performed such that one constituent element can execute more processes.

Also, processing of each of the constituent elements may be executed by one hardware module or may be executed by a plurality of hardware modules.

Also, processing of each of the constituent elements may be implemented by one program or may be implemented by a plurality of programs.

Also, having described the case where, according to the aforementioned embodiment, the "information processing apparatus" is configured as the first server apparatus 1, embodiments of the present invention are not limited thereto. The "information processing apparatus" may be configured as a personal computer, or the "information processing apparatus" may be configured as a tablet terminal.

Also, although the first server apparatus 1 is configured as an application server apparatus having a server-less function according to the aforementioned embodiment, embodiments of the present invention are not limited thereto. The first server apparatus 1 may be configured as a general server apparatus without having a server-less function.

Also, although, according to the aforementioned embodiment, the application program to be executed by the second server apparatus 2 is the personal authentication program that executes personal authentication processing on a driver of the vehicle 3, embodiments of the present invention are not limited thereto. The application program to be executed by the second server apparatus 2 is only required to be an application program which is requested to be activated upon start of the vehicle 3. The application program may be, for example, a content distribution program for, for example, tunes and movies.

Also, although, according to the aforementioned embodiment, the first control program is stored in the first memory 11B in the first control unit 11, the first control program can be configured by an aspect of another recording medium or a transmission medium that transmits the first control program.

As the recording medium, a magnetic or optical recording medium or a semiconductor memory device can be used. Specifically, a portable recording medium such as a flexible disk, an HDD, a compact disk read only memory (CD-ROM), a DVD, a Blue-Ray® Disc, a magneto-optical disk, a flash memory, or a card recording medium or a fixed recording medium may be used. Also, the recording medium may be a nonvolatile storage device such as a RAM, a ROM or an HDD included in the first server apparatus 1.

Also, for example, the processing units in the flowchart shown in FIG. 9 are divisions based on main processing details for easy understanding of the processing of the information processing system 100, and the present invention is not limited by how the processing units are divided and the names thereof. The processing of the information processing system 100 may be divided into more processing units based on processing details thereof. Also, the processing of the information processing system 100 may be divided such that one processing unit includes more processes.

Also, for example, the processing units in the flowchart shown in each of FIG. 10 and FIG. 11 are divisions based on main processing details for easy understanding of the processing of the first server apparatus 1, and the present invention is not limited by how the processing units are divided and the names thereof. The processing of the first server apparatus 1 may be divided into more processing units based on processing details thereof. Also, the processing of the first server apparatus 1 may be divided such that one processing unit includes more processes.

REFERENCE SIGNS LIST 100 information processing system
1 first server apparatus (information processing apparatus)
11 first control unit
111 obtaining unit
112 model generating unit
113 estimating unit
114 evaluating unit
115 instructing unit
116 first transmitting/receiving unit
117 history storage unit
118 model storage unit
2 second server apparatus (application server apparatus)
21 second control unit
211 instruction receiving unit
212 activation instructing unit
213 personal authentication unit
214 second transmitting/receiving unit
215 image storage unit
3 vehicle
31 third control unit
311 start detecting unit
312 parking detecting unit
313 timer unit
314 authenticating unit
315 third transmitting/receiving unit
321 engine start button
322 GPS unit
323 imaging unit
324 touch panel
4 smartphone (mobile terminal apparatus)
41 fourth control unit
411 position obtaining unit
412 determining unit
413 fourth transmitting/receiving unit
42 GPS unit
AP approach state
AR personal authentication result
AVN, AV1, AV2 average position
AVNM, AV11, AV21 average time
CM activation instruction
DS start day of the week
DE parking day of the week
LS start position
LE parking position
MD learned model
MD1-MD7 Monday model-Sunday model
PLC position cluster storage unit
PF, PFA facial image
PL1 learning period
SN, S1-S3 position cluster
SNM, S11, S21, S22 time cluster
SP separation state
TCL time cluster storage unit
TS start date and time
TE parking date and time
TU activation date and time
TW waiting time
US start time
$\sigma$, $\sigma N$, $\sigma 1$, $\sigma 2$, $\sigma NM$, $\sigma 21$, $\sigma 22$ standard deviation
$\sigma S$ threshold value

What is claimed is:

1. An information processing apparatus communicably connected to each of an application server apparatus having a server-less function, which manages allocation of machines and resources required for applications, and a vehicle, the information processing apparatus comprising:
a processor, wherein the processor includes:
an obtaining unit obtaining, from the vehicle, start position information indicating a position where the vehicle has been started, start date-and-time information indicating a date and time at which the vehicle has been started, parking position information indicating a position where the vehicle has been parked, and parking date-and-time information indicating a date and time at which the vehicle has been parked;
a storage unit storing a start history corresponding to the start position information obtained by the obtaining unit and start date-and-time information, and corresponding to the parking position information obtained by the obtaining unit and the parking date-and-time information in a memory;
a model generating unit generating a learned model by performing cluster analysis on the history of the start position information, the start date-and-time information, the parking position information, and the parking date-and-time information;
an estimating unit estimating a date and time at which the vehicle is started based on the learned model; and
an instructing unit instructing the application server apparatus to activate an application program, which is executed when a driver boards the vehicle, when it is determined that it has reached activation date and time estimated by the estimating unit,
wherein the obtaining unit obtains the latest parking position information and parking date-and-time information at a time of parking the vehicle, and
the estimating unit estimates the date and time at which the vehicle is started first after the latest parking and time at which the vehicle is parked at the time of obtaining the latest parking position information and parking date-and-time information obtained by the obtaining unit.

2. The information processing apparatus according to claim 1, wherein
the obtaining unit further obtains start day-of-week information indicating a day of the week on which the vehicle has been started and parking day-of-week information indicating a day of the week on which the vehicle has been parked, and the estimating unit estimates the date and time at which the vehicle is started first after the latest parking and time at which the vehicle is parked based on the start position information, the start date-and-time information, the start day-of-week information, the parking position information, the parking date-and-time information, and the parking day-of-week information.

3. The information processing apparatus according to claim 2, wherein the model generating unit cluster-analyzes the start position information for each day of the week indicated by the start day-of-week information, and the learned model includes the cluster-analyzed start position information.

4. The information processing apparatus according to claim 3, wherein the model generating unit cluster-analyzes start times included in the start date-and-time information for each day of the week indicated by the start day-of-week information, and the learned model includes the cluster-analyzed start times.

5. The information processing apparatus according to claim 1, wherein the information processing apparatus is further communicably connected to a mobile terminal apparatus determining whether a distance to the vehicle is greater than or equal to a threshold value or not, and the instructing unit instructs the application server apparatus to activate the application program in accordance with a determination result by the mobile terminal apparatus.

6. The information processing apparatus according to claim 5, wherein the processor further includes an evaluating unit evaluating a precision of estimation of a date and time at which the vehicle is started by the estimating unit, wherein if the evaluating unit evaluates that the precision of estimation is lower than or equal to a predetermined precision, the instructing unit instructs the application server apparatus to activate the application program in accordance with a determination result by the mobile terminal apparatus.

7. An information processing system comprising:

an application server apparatus having a server-less function which manages allocation of machines and resources required for applications;

a vehicle; and an information processing apparatus being communicably connected to each of the application server apparatus and the vehicle, wherein the information processing apparatus includes a processor, the processor includes:

an obtaining unit obtaining, from the vehicle, start position information indicating a position where the vehicle has been started, start date-and-time information indicating a date and time at which the vehicle has been started, parking position information indicating a position where the vehicle has been parked, and parking date-and-time information indicating a date and time at which the vehicle has been parked;

a storage unit storing a start history corresponding to the start position information obtained by the obtaining unit and start date-and-time information, and corresponding to the parking position information obtained by the obtaining unit and the parking date-and-time information in a memory;

a model generating unit generating a learned model by performing cluster analysis on the history of the start position information, the start date-and-time information, the parking position information, and the parking date-and-time information;

an estimating unit estimating a date and time at which the vehicle is started based on the learned model; and an instructing unit instructing the application server apparatus to activate an application program, which is executed when a driver boards the vehicle, when it is determined that it has reached activation date and time estimated by the estimating unit, wherein the obtaining unit obtains the latest parking position information and parking date-and-time information at a time of parking the vehicle, and the estimating unit estimates the date and time at which the vehicle is started first after the latest parking and time at which the vehicle is parked at the time of obtaining the latest parking position information and parking date-and-time information obtained by the obtaining unit.

* * * * *